(12) United States Patent
Furuki et al.

(10) Patent No.: US 12,253,610 B2
(45) Date of Patent: Mar. 18, 2025

(54) NETWORK MEASUREMENT DEVICE AND NETWORK MEASUREMENT METHOD

(71) Applicant: ANRITSU CORPORATION, Kanagawa (JP)

(72) Inventors: Atsushi Furuki, Kanagawa (JP); Shinichi Seto, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 330 days.

(21) Appl. No.: 17/804,384

(22) Filed: May 27, 2022

(65) Prior Publication Data
US 2023/0073766 A1   Mar. 9, 2023

(30) Foreign Application Priority Data

Sep. 6, 2021 (JP) .................................. 2021-144855

(51) Int. Cl.
| | |
|---|---|
| *G01S 19/24* | (2010.01) |
| *G01S 19/09* | (2010.01) |
| G01S 19/14 | (2010.01) |
| H04W 4/029 | (2018.01) |
| H04W 24/08 | (2009.01) |

(52) U.S. Cl.
CPC .............. *G01S 19/24* (2013.01); *G01S 19/09* (2013.01); *G01S 19/14* (2013.01); *H04W 4/029* (2018.02); *H04W 24/08* (2013.01)

(58) Field of Classification Search
CPC .......... G01S 19/14; G01S 19/24; G01S 19/09; H04W 4/029; H04W 24/08
USPC .......................... 342/357.46, 357.52, 357.63
See application file for complete search history.

(56) References Cited

U.S. PATENT DOCUMENTS

| | | | | |
|---|---|---|---|---|
| 10,057,725 B2* | 8/2018 | Murphy | ................ | H04W 4/021 |
| 10,292,128 B2* | 5/2019 | Chen | ..................... | G01S 5/0236 |
| 2007/0049267 A1* | 3/2007 | Kota | ..................... | H04W 24/00 |
| | | | | 455/423 |
| 2021/0404817 A1* | 12/2021 | Yamamoto | ......... | G01C 21/3461 |
| 2023/0070916 A1* | 3/2023 | Furuki | .................... | G01S 19/14 |
| 2023/0168387 A1* | 6/2023 | Yoshida | .................. | G01S 19/28 |
| | | | | 342/357.65 |
| 2023/0319610 A1* | 10/2023 | Kasagi | .................. | H04W 24/08 |
| | | | | 455/423 |

(Continued)

FOREIGN PATENT DOCUMENTS

| | | | | | |
|---|---|---|---|---|---|
| JP | H0627215 | A | * | 2/1994 | ............... G01S 5/14 |
| JP | 2018-157375 | A | | 10/2018 | |
| WO | WO-2022208769 | A1 | * | 10/2022 | ............ H04W 12/02 |

*Primary Examiner* — Chuong P Nguyen
(74) *Attorney, Agent, or Firm* — McDonald Hopkins LLC

(57) ABSTRACT

A network measurement device includes a display control unit that displays location information stored in a location information table and a setting control unit that sets the location information selected from the displayed location information as positioning start location information of a moving destination, and has a configuration of, after setting the positioning start location information, executing positioning at the moving destination based on reception signal information from a GNSS and measuring a time synchronization error between reference time information acquired from the GNSS and reference time information under test used by an apparatus in a location of the moving destination by comparing the reference time information and the reference time information under test.

6 Claims, 12 Drawing Sheets

(56) References Cited

U.S. PATENT DOCUMENTS

2024/0177604 A1\* 5/2024 Noguchi .............. G08G 1/0112

\* cited by examiner

| Location name | Latitude | Longitude | Altitude [m] |
|---|---|---|---|
| anritsu1 | 35.4460000 | 139.3420000 | 120.0 |
| anritsu2 | 35.4462013 | 139.3425800 | 118.6 |
| anritsu3 | 35.4470000 | 139.3430000 | 121.6 |
| anritsu4 | 35.4000000 | 139.3000000 | 121.6 |
| anritsu5 | 35.7333423 | 139.5666670 | 120.1 |

NETWORK MEASUREMENT DEVICE AND NETWORK MEASUREMENT METHOD

TECHNICAL FIELD

The present invention relates to a portable network measurement device and a network measurement method of measuring the performance of a network under test based on reception signal information from a global navigation satellite system (GNSS).

BACKGROUND ART

In the related art, as a measurement system for measuring the performance of a network, a server measurement device and a plurality of client measurement devices, which are connected to the network that is a measurement target (the network under test), are included, and the server measurement device is known to have a configuration in which a client measurement device switches an application currently running to a predetermined application and measures the characteristics of the network under test in cooperation with the client measurement device (see, for example, Patent Document 1).

In the measurement system described in Patent Document 1, the server measurement device instructs each client measurement device, which is located far from a disposition location (fixed position) of the server measurement device, to perform transaction processing, and for example, has a configuration to perform a bit error rate (BER) test, a request for comments (RFC) 2544 test, or the like targeting the network under test while switching applications related to the BER test, the RFC 2544 test, or the like.

RELATED ART DOCUMENT

Patent Document

[Patent Document 1] JP-A-2018-157375

DISCLOSURE OF THE INVENTION

Problem that the Invention is to Solve

On the other hand, in this kind of measurement system, there is a measurement system in which using a portable measurement device, the measurement device is moved to a disposition location of each client in a network under test as needed, is connected to the client at each of the locations of a moving destination, and measures whether the network under test is being operated correctly based on reception signal information transmitted from GNSS.

FIGS. 14A and 14B illustrate examples of a configuration of a network that is a measurement target of a portable measurement device and a disposition mode of a portable measurement device 8 in the network. This network has a configuration in which an apparatus that operates as a master (grandmaster clock) 5, an apparatus that operates as a slave (boundary clock) 6, and a plurality of apparatuses 7a, 7b, 7c, and 7d that operate as slaves with the apparatus 6 as a master are connected by a communication path with a predetermined communication standard. In this network, for example, the apparatus 6 synchronizes with the reference time by making the apparatus 5, which is a providing source of the time information (reference time) received from the GNSS, communicate with the apparatus 6 based on a precision time protocol (PTP), and when the apparatuses 7a, 7b, 7c, and 7d are in synchronization with the reference time by making the apparatus 6 communicate with the apparatuses 7a, 7b, 7c, and 7d based on the PTP, the apparatuses 7a, 7b, 7c, and 7d operate in synchronization with the grandmaster clock.

FIG. 14A illustrates a disposition mode of the measurement device 8 when performing one pulse per second time error (1PPS TE) measurement, and FIG. 14B illustrates a disposition mode of the measurement device 8 when performing packet time error (Packet TE) measurement. The 1PPS TE measurement and the Packet TE measurement are included in the measurement (time synchronization error measurement) related to the time synchronization of the network under test (apparatus 7a), as will be described later. In the 1PPS TE measurement, as illustrated in FIG. 14A, the portable measurement device 8 is moved to, for example, the location of the apparatus 7a at an end portion of the network having the above configuration (the network under test) and connected to the apparatus 7a, and the 1PPS TE measurement is performed by comparing a reference 1PPS signal generated based on the reception signal information from the GNSS at the location and a signal output from the apparatus 7a (a 1PPS signal under test). The 1PPS TE measurement is configured such that the measurement devices 8 are moved to the locations of the apparatuses 7b, 7c, and 7d, and connect to the apparatuses 7b, 7c, and 7d, and the same measurement as described above is performed at each location.

Regarding the Packet TE measurement, as illustrated in FIG. 14B, for example, it is configured such that the measurement device 8 is moved to the location of the apparatus 7a and is connected to the network under test in place of the apparatus 7a (replace the apparatus 7a with the measurement device 8), and then the apparatus 6 as a master for the apparatus 7a, measures a packet time error (Packet TE) of a precision time protocol packet (PTP packet) received from the apparatus 5 that is a higher-level apparatus of the apparatus 6. Also in this case, it is possible to perform the same Packet TE measurement as described above after the measurement devices 8 are moved to the locations of the apparatuses 7b, 7c, and 7d as needed, and are connected to the network under test in place of the apparatuses 7b, 7c, and 7d.

In this way, the time synchronization error measurement in the network under test includes the 1PPS TE measurement and the Packet TE measurement, and in order to check that correct time is being delivered to the network from the grandmaster clock that is a synchronization source, the portable measurement device 8 is moved between each location of the network under test and is connected to the apparatus to be tested at each location, and then the time synchronization error measurement is performed for each of the locations. Normally, the time delivered from the grandmaster clock is synchronized with the GNSS, and the measurement device 8 also needs to be synchronized with the GNSS when measuring an error.

As a representative example of the network under test having the configurations illustrated in FIGS. 14A and 14B, a so-called PTP network system (see FIG. 1) is known in which the reference time generated based on the reception signal information from the GNSS is transferred to a plurality of stations, for example, base stations that are respectively disposed in different locations, and each station, for example, each base station, is operated synchronously by using the PTP that synchronizes clocks in the entire computer network.

In recent years, a network (5G network) that performs communication with the 5th generation new radio (5G NR) standard, whose technological development is rapidly progressing, is realized by the PTP network system, and by using the PTP, it is possible to achieve clock synchronization with the precision of microseconds or less between devices in the same synchronization network.

For the 5G networks, it is necessary to establish high precision synchronization in order to reliably perform so-called handover, in which the base station that communicates with the mobile station is switched during communication for realizing high-speed communication. Further, since the required precision of the network is increasing, it is required to improve the time synchronization accuracy and precision of the measurement device with respect to the GNSS from the viewpoint of reducing the measurement error.

Regarding the conventional portable network measurement device (see the measurement devices 8 in FIGS. 14A and 14B) whose test target is the networks illustrated in FIGS. 14A and 14B, an apparatus constituting the network, the 5G network, or the like, in which the demand for high precision time synchronization accuracy and precision is increasing, at operation by using another method such as holdover, since the required precision such as GNSS synchronization accuracy and precision may not be met in operation, the network measurement device is moved to a location where the device is used and establishes synchronization with the GNSS based on the reception signal information from the GNSS, and then the measurement is started.

In such an operation, with the conventional network measurement device, in a new location, for example, as illustrated in FIG. 9, after turning on the power, processing reaches step S21 (high precision positioning) in which more precise positioning is performed by repeatedly performing positioning several times, from step S20 (low-precision positioning) in which the positioning is started. In this case, the processing from the start of step S20 to the end of step S21 (synchronized with the GNSS) may take, for example, substantially several tens of minutes. Here, since the time accuracy and precision is not high in a period during which the synchronization is made with the GNSS (a period from step S20 to step S21), a user is not able to start the measurement (see step S22) quickly, and it is difficult to efficiently perform the time synchronization error measurement of the network under test at each location that is a moving destination.

Regarding the operation of the portable network measurement device described above, a method is conceivable in which the previously measured location information (for example, latitude, longitude, altitude) is stored and the information is used repeatedly. However, in this case, the synchronization time becomes short, but when using the information in a plurality of locations, it takes a lot of time and effort to input for switching information, and it may induce input mistakes. Thereby, despite being portable, there is the problem that it is difficult to efficiently perform measurements at different locations.

The present invention has been made in view of the above-mentioned circumstances, and the object of the present invention is to provide a measurement device and a measurement method in which measurement can be started on a network under test, which requires extremely high time accuracy and precision, by establishing the synchronization with a satellite positioning system in a short time with a simple operation even when a measurement location changes, thereby efficient measurement can be performed.

Means for Solving the Problem

In order to solve the above problems, a network measurement device according to claim 1 of the present invention is a portable network measurement device 50 that uses a network under test (1), in which a plurality of apparatuses (21, 30, 31, 32) disposed in different locations from each other operate in time synchronization with reference time information acquired from a global navigation satellite system (GNSS) (10), is moved to a desired location and connected to any of the apparatuses, and then starts positioning at the location based on reception signal information from the GNSS, establishes time synchronization with the GNSS, and then measures performance of the network under test, the network measurement device includes location information storage means (56a) for storing information about at least one location where the positioning has been executed previously, as location information, display control means (64) for displaying the location information stored in the location information storage means when the network measurement device is connected to the apparatus in the location, and setting means (60) for setting location information selected from the displayed location information as positioning start location information.

With this configuration, since the positioning is started using the location information stored when the positioning was performed previously for each location where the network measurement device is moved, the network measurement device according to claim 1 of the present invention can start measurement on the network under test, which requires extremely high time accuracy and precision, by establishing the synchronization with the GNSS in a short time by a simple operation even when the measurement location changes, thereby the measurements such as the synchronization error measurement can be efficiently performed.

Further, the network measurement device according to claim 2 of the present invention may further include an antenna input terminal 51 capable of connecting an existing GNSS antenna (28b) that corresponds to the apparatus in place of a belonging GNSS antenna (28a) that belongs to the network measurement device, and positioning control means (62) for executing positioning based on reception signal information received by the existing GNSS antenna and reception processing of the reception signal information, based on the positioning start location information set by the setting means, in a state in which the network measurement device is connected to any of the apparatuses and the existing GNSS antenna corresponding to the connected apparatus is connected to the antenna input terminal.

With this configuration, the network measurement device according to claim 2 of the present invention can perform input of the reception signal information from the existing GNSS antenna by connecting the self network measurement device to the apparatus at the location where the network measurement device is moved and connecting the existing GNSS antenna to the antenna input terminal. The existing GNSS antenna has high precision because the location of the antenna's position is fixed, or has good quality where the high signal intensity is received and less noise occurs because the view is secured as a reception condition, thereby it is possible to acquire high time accuracy and precision.

Further, in the network measurement device according to claim 3 of the present invention, the display control means may display a setting screen (70) having input tools (71, 73) for inputting identification information for identifying the location and each information on latitude, longitude, and altitude of the location, and the setting means may set the latitude, longitude, and altitude of the location input from the setting screen as location information about the location, and while the positioning is being executed at the location based on the set location information, when time, during which synchronization with the GNSS is continued after starting the positioning, has passed a predetermined time set in advance, and manually or automatically stores the information on the latitude, longitude, and altitude of the location when the positioning is ended, corresponding to the identification information input from the setting screen, as the location information, in the location information storage means.

With this configuration, the network measurement device according to claim 3 of the present invention can easily and automatically or manually store the highly precise location information corresponding to the location in the location information storage means according to the measurement of the network under test at the first location. As a result, when the measurement is performed at the location next time, the location information can be easily set, and the time for establishing the synchronization with the GNSS can be significantly shortened, and then efficient measurement becomes possible.

Further, in the network measurement device according to claim 4 of the present invention, the display control means may display an edit screen (80*b*) having an area (81) for displaying the location information stored in the location information storage means and selection buttons (83*a*, 83*b*, 83*c*) for selecting one of edit types of addition, removal, and edition location information designated from the displayed location information, and the network measurement device may further include edit processing means (61) for executing any one of edit processing among adding, removing, and editing in response to a selection of the edit type by the selection button, with respect to the designated location information.

With this configuration, the network measurement device according to claim 4 of the present invention can easily perform each processing of adding, removing, and editing location information with respect to the location information storage means by using the edit screen.

Further, the network measurement device according to claim 5 of the present invention may further include location information sharing control means (65) for outputting the location information stored in the location information storage means to an export storage area (56*b*) and storing the location information in the export storage area, and fetching the location information stored in the export storage area and storing the location information in the location information storage means.

With this configuration, the network measurement device according to claim 5 of the present invention can share the location information about each location stored in the location information storage means with another network measurement device by a simple operation.

In order to solve the above problems, the network measurement method according to claim 6 of the present invention is a network measurement method of measuring the network under test by using the network measurement device (50) according to any one of claims 1 to 5, the network measurement method includes a step (S3) of moving the network measurement device to a desired location and connecting the network measurement device to any of the apparatuses, and connecting a GNSS antenna to an antenna input terminal, a display control step (S4) of displaying the location information stored in the location information storage means when the network measurement device is connected to the apparatus in the location, a setting step (S5, S6) of setting location information selected from the displayed location information as positioning start location information, a positioning control step (S7, S8) of executing positioning at the location based on reception signal information received by the GNSS antenna and reception processing of the reception signal information, based on the set positioning start location information, and a measurement step (S9) of measuring a time synchronization error between reference time information (a reference 1PPS signal) acquired from the GNSS and reference time information under test (a 1PPS signal under test), which is time information output by the apparatus in the location, by comparing the reference time information and the reference time information under test when time, during which synchronization with the GNSS is continued after starting the positioning, has passed a predetermined time set in advance.

With this configuration, the network measurement method according to claim 6 of the present invention can be applied to a network measurement method using the network measurement device according to any one of claims 1 to 5, and then since the positioning is started using the location information stored when the positioning was performed previously for each location where the network measurement device is moved, the measurement can be started on the network under test, which requires extremely high time accuracy and precision, by establishing the synchronization with the GNSS in a short time with a simple operation even when the measurement location changes, thereby efficient measurement such as the synchronization error measurement can be performed.

Advantage of the Invention

The present invention is to provide a measurement device and a measurement method in which measurement can be started on a network under test, which requires extremely high time accuracy and precision, by establishing the synchronization with a satellite positioning system in a short time with a simple operation even when a measurement location changes, thereby efficient measurement can be performed.

BRIEF DESCRIPTION OF THE DRAWINGS

FIG. 7A illustrates a location information edit screen that is a transition source, FIG. 7B illustrates an add setting screen, FIG. 7C illustrates a remove alert screen, and FIG. 7D illustrates a change setting edit screen.

FIG. 9 is a diagram illustrating a processing image of a portable network measurement device from a low-precision positioning state to a high precision positioning state until the device is in synchronization with a GNSS after power is turned on.

FIG. 13A illustrates fluctuation characteristics of a time error, and FIG. 13B illustrates fluctuation characteristics of a filter time error.

FIG. 14A illustrates the disposition mode of the measurement device when 1PPS TE measurement is performed, and FIG. 14B illustrates the disposition mode of the measurement device when Packet TE measurement is performed.

BEST MODE FOR CARRYING OUT THE INVENTION

Hereinafter, an embodiment of a network measurement device and a network measurement method according to the present invention will be described with reference to the drawings.

Figure 1:
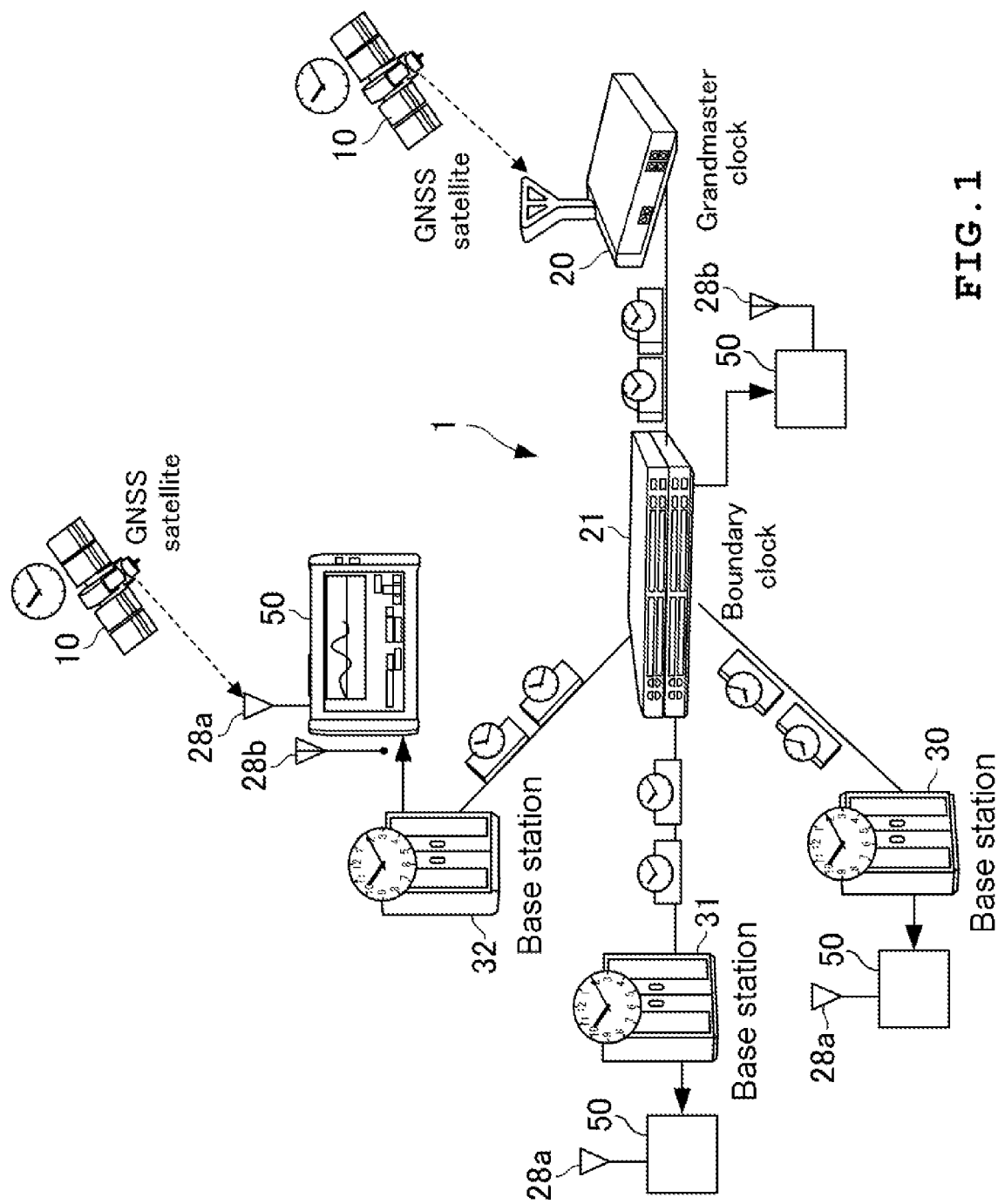
FIG. 1 is a conceptual diagram illustrating a configuration of a main part of a 5G network that is a measurement target of a network measurement device according to an embodiment of the present invention.
Figure 2:
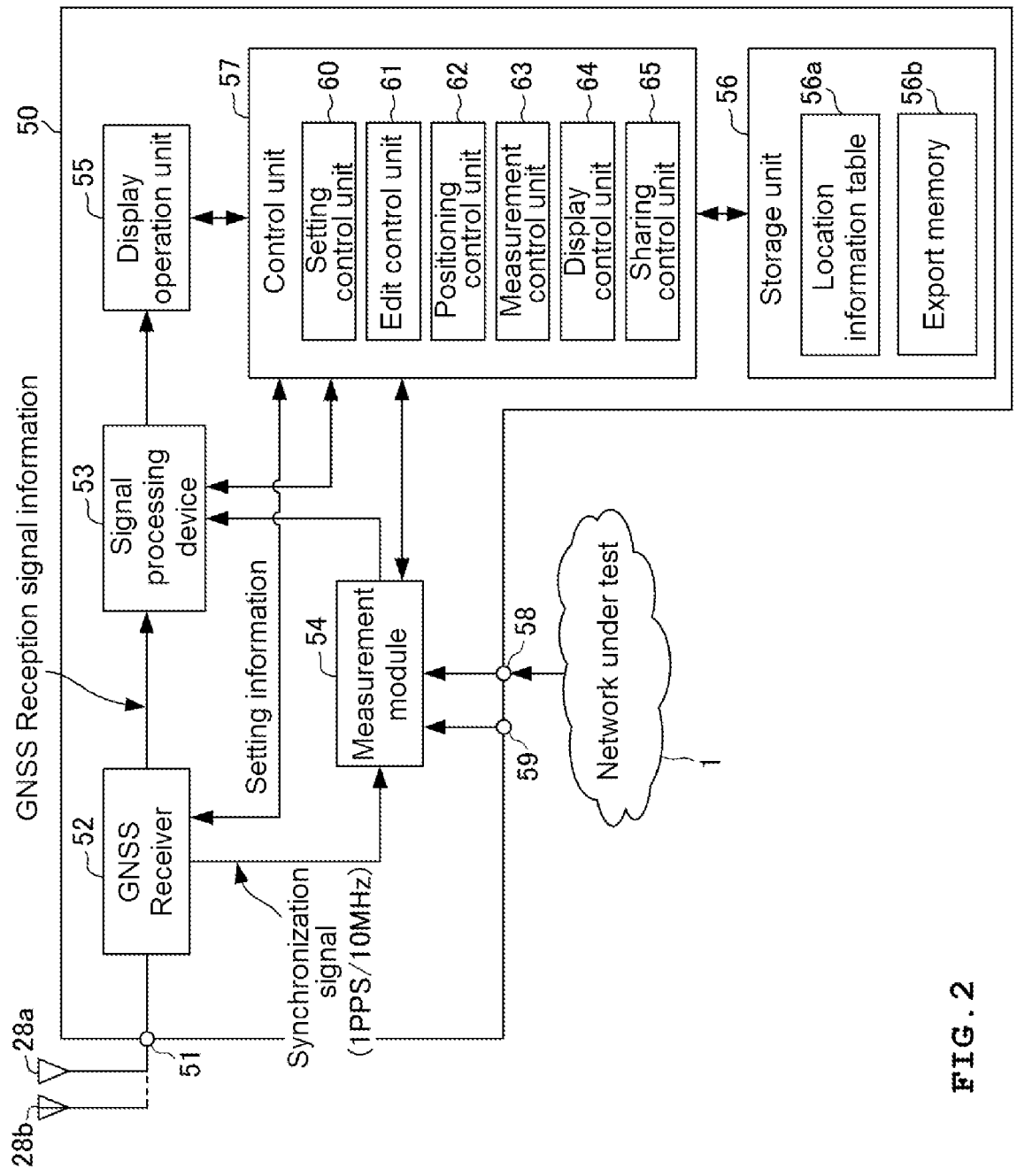
FIG. 2 is a block diagram illustrating a functional configuration of the network measurement device according to the embodiment of the present invention.

FIG. 1 is a conceptual diagram illustrating a configuration of a main part of a 5G network 1 that is a measurement target of a network measurement device 50 according to an embodiment of the present invention. FIG. 2 is a block diagram illustrating a functional configuration of the network measurement device 50 according to the embodiment of the present invention.

As illustrated in FIG. 1, the 5G network 1 is configured by connecting a grandmaster clock 20, a boundary clock 21, and a plurality of base stations 30, 31, and 32 so as to be communicable via communication means with a predetermined communication standard such as Ethernet (registered trademark). The present invention is not limited to the 5G network, but the networks illustrated in FIGS. 14A and 14B or an apparatus constituting the network can be defined as a target under test. In this case, the plurality of base stations 30, 31, and 32 are replaced with network apparatuses, data centers in which the base stations are installed, or the like, respectively.

In the 5G network 1 having such a configuration, the grandmaster clock 20 transmits a PTP packet based on time information received from a GNSS satellite 10 constituting a part of a GNSS, for example. The boundary clock 21 receives the PTP packet and performs synchronization, and performs time synchronization with the base stations 30, 31, and 32 based on the synchronization. In this way, the 5G network is synchronized by synchronizing each of the base stations 30, 31, and 32 with the grandmaster clock 20.

Figure 14A:
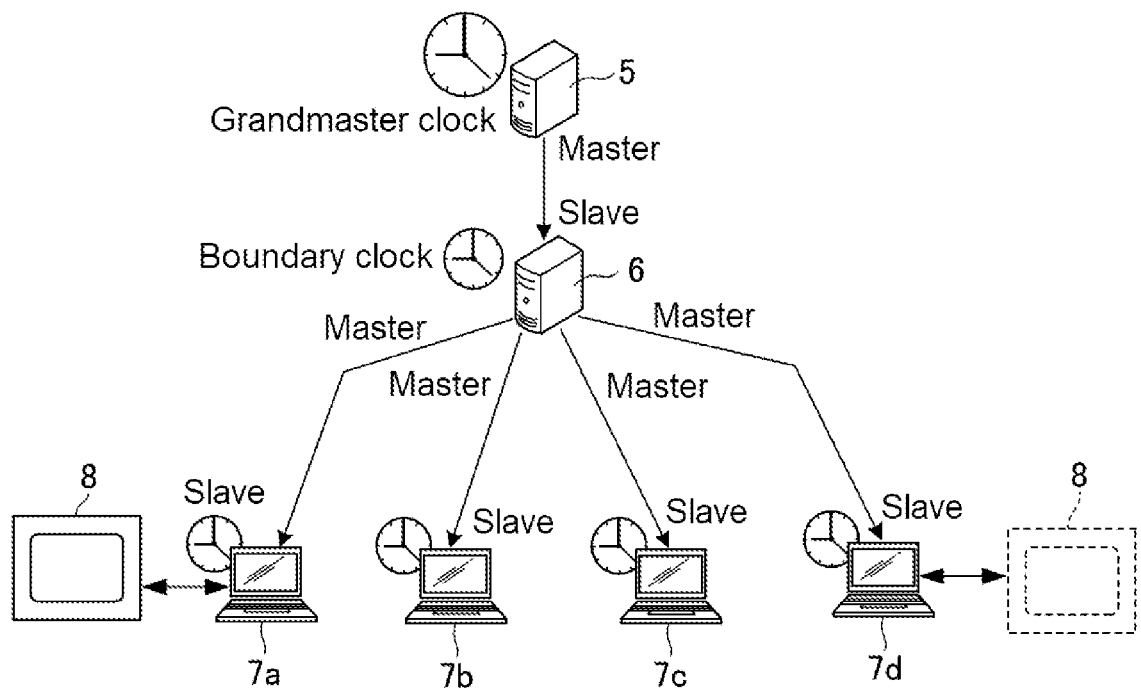
FIGS. 14A and 14B are diagrams illustrating an example of a configuration of a PTP network that is a measurement target of the portable measurement device and a disposition mode of the portable measurement device, where
Figure 14B:
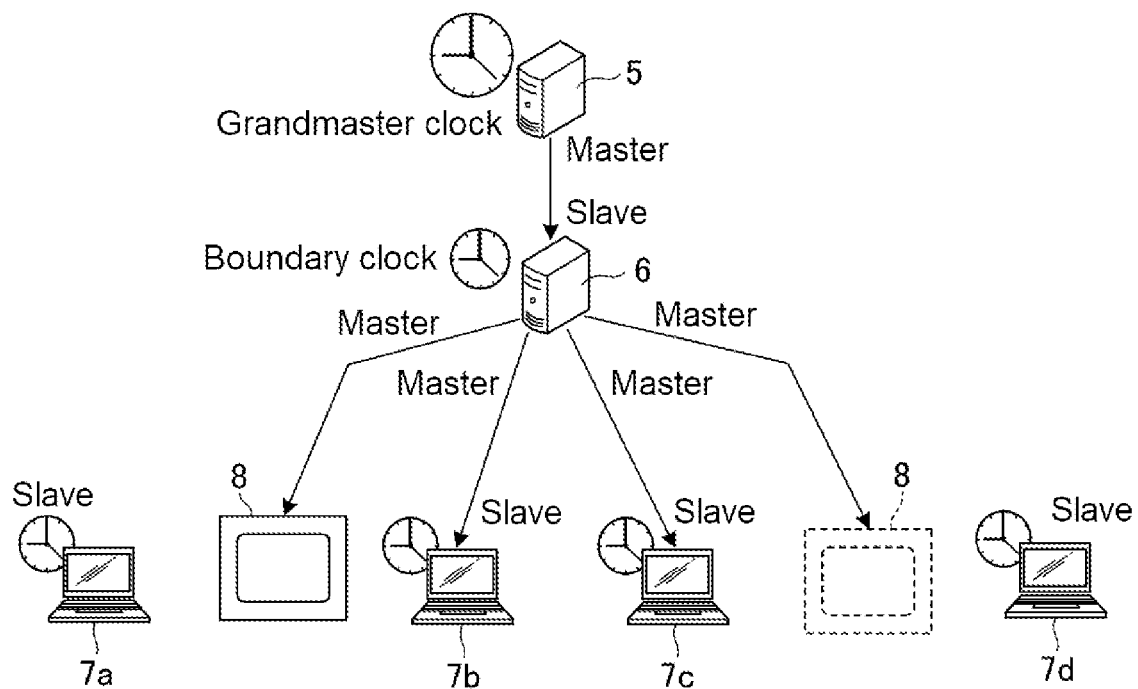

For example, as represented by system configurations illustrated in FIGS. 14A and 14B, the 5G network 1 is realized by a PTP network having a configuration of transferring the PTP packet, which is based on time information acquired from the GNSS, from a master to a slave, and further transferring the PTP packet from the master when the slave is defined as a master to a plurality of slaves located under the master.

The network measurement device 50 according to the present embodiment is connected to the base stations 30, 31, and 32, or the boundary clock 21 constituting the 5G network 1 illustrated in FIG. 1 as needed and is operated as a communication tester that performs various measurements as to whether or not the 5G network 1 meets the 5G communication standard. Examples of the measurement that targets the 5G network 1 in the network measurement device 50 include time synchronization error measurement (time synchronization error test), for example.

Examples of the time synchronization error measurement include 1PPS TE measurement. The 1PPS TE measurement is a test for determining whether or not the base stations 30, 31, and 32 are synchronized with the grandmaster clock 20 (see FIG. 14A). When the 1PPS TE measurement is performed, it is necessary that the network measurement device 50 connects any of the base stations 30, 31, and 32 to a 1PPS measurement terminal 59 (see FIG. 2), and connects a portable belonging GNSS antenna 28a that belongs to the network measurement device 50 or an existing GNSS antenna 28b installed in the vicinity of the base stations 30, 31, and 32 to an antenna input terminal 51. In the configuration illustrated in FIG. 1, for the base stations 31 and 32, the existing GNSS antennas 28b may or may not exist beside the base stations 31 and 32 as in the base station 30.

The time synchronization error measurement includes, for example, Packet TE measurement. In the Packet TE measurement, for example, an error of the PTP packet received from the grandmaster clock 20 in the boundary clock 21 is measured (see FIG. 14B). When the Packet TE measurement is performed, it is necessary that the network measurement terminal 58 (see FIG. 2) of the network measurement device 50 is connected to an external connection port (not illustrated) of the boundary clock 21, and thereafter, for example, the existing GNSS antenna 28b described above is connected to the antenna input terminal 51. The existing GNSS antenna 28b referred to in the present invention indicates a reception antenna system including a GNSS antenna main body, a cable, a reception amplifier, a filter, and the like. The 5G network 1 constitutes the network under test of the present invention, and the boundary clock 21, base stations 30, 31, and 32 constitute the apparatuses of the present invention. Further, the belonging GNSS antenna 28a and the existing GNSS antenna 28b described above constitute the GNSS antenna of the present invention.

The network measurement device 50 is realized by a portable device that can be moved to a location where the time synchronization error measurement is performed, for example, a location where the 1PPS TE measurement is performed (disposition locations of the base stations 30, 31, and 32), or a location where the Packet TE measurement is performed (a disposition location of the boundary clock 21), as needed. Hereinafter, the disposition locations of the base stations 30, 31, and 32 and the disposition location of the boundary clock 21 may be referred to as a test location.

The network measurement device 50 establishes synchronization with the GNSS satellite 10 at the test location of the moving destination and then performs the time synchronization error measurement, for example, the 1PPS TE measurement that targets the base stations 30, 31, and 32. The network measurement device 50 stores location information (the location information obtained when the positioning has been executed previously) corresponding to the test location, sets the location information prior to the start of the time synchronization error measurement, for example, the 1PPS TE measurement (the same applies to the Packet TE measurement that targets the boundary clock 21), executes the positioning based on the set location information (positioning start location information), and performs synchronization control for establishing the synchronization with the GNSS satellite 10. As the location information, information on latitude, longitude, and altitude corresponding to each disposition location (test location) of the base stations 30, 31, and 32, and the boundary clock 21 is set.

The GNSS satellite 10, which is an acquisition source of the time information used for the above-mentioned synchronization control and the like in the network measurement device 50, constitutes a part of the GNSS that enables calculation of a position or a velocity direction and acquisition of high precision time by receiving radio waves transmitted from a plurality of navigation satellites toward the ground. As the GNSS to which the GNSS satellite 10 belongs, for example, a global positioning system (GPS) can be used. Other GNSS satellites 10 that can be used include a GLONASS, a Galileo, a BeiDou, a QZSS (quasi-zenith satellite system), and the like.

In the above time synchronization error measurement, for example, the 1PPS TE measurement, in the network measurement device 50, by the synchronization control mentioned above, for example, when the time, during which the synchronization with the GNSS satellite 10 is continued, has passed a predetermined time set in advance, it is determined, for example, whether the network meets the desired stability or synchronization accuracy by comparing reference time information (a reference 1PPS signal) generated based on the time information acquired from the GNSS satellite 10 at this time, and reference time information under test (a 1PPS signal under test) output based on the time information acquired by the base stations 30, 31, and 32, which are the targets of the time synchronization error measurement, from the GNSS satellite 10 via the higher-level apparatuses (grandmaster clock 20, boundary clock 21).

In the present embodiment, the network measurement device 50 includes a location information table 56a (see FIG. 2) for storing the location information in advance obtained in the previous positioning corresponding to each test location of the 5G network 1. The network measurement device 50 has, for example, a configuration of selecting and setting the location information corresponding to the test location among the location information stored in the location information table 56a when the above-mentioned synchronization control is started.

Based on the above schematic description, the configuration of the network measurement device 50 according to the present embodiment will be described in detail with reference to FIGS. 2 to 7.

As illustrated in FIG. 2, the network measurement device 50 according to the present embodiment includes an antenna input terminal 51, a GNSS receiver 52, a signal processing device 53, a measurement module 54, a display operation unit 55, a storage unit 56, a control unit 57, a network measurement terminal 58, and a 1PPS measurement terminal 59.

The antenna input terminal 51 is a terminal for inputting a reception signal obtained by a GNSS antenna (satellite positioning system reception antenna) for receiving a signal transmitted from the GNSS satellite 10. The network measurement device 50 has a configuration in which the GNSS antenna is capable of being attached to and detached from the antenna input terminal 51. In the time synchronization error measurement, for example, the 1PPS TE measurement, the network measurement device 50 can connect, as the GNSS antenna described above, a belonging GNSS antenna 28a that belongs to the network measurement device 50, or an existing GNSS antenna 28b installed in the vicinity of the base stations 30, 31, and 32 of the 5G network 1, to the antenna input terminal 51, respectively. The 1PPS measurement terminal 59 is a terminal used for inputting a signal under test (for example, a 1PPS signal under test or the like) output from, for example, the base stations 30, 31, 32, or the like, which are the targets under test when the 1PPS TE measurement is performed.

Further, when the Packet TE measurement is performed, the existing GNSS antenna 28b installed in the vicinity of the boundary clock 21 is connected to the antenna input terminal 51, for example, in place of the belonging GNSS antenna 28a. The network measurement terminal 58 is a terminal used for performing connection with an external connection port of the boundary clock 21, which is the target under test, for example, when the Packet TE measurement is performed.

As described above, the antenna input terminal 51 is configured to be capable of connecting the existing GNSS antenna 28b that is installed in the vicinity of an apparatus such as the base stations 30, 31, and 32, and the boundary clock 21, in place of the belonging GNSS antenna 28a that belongs to the network measurement device 50.

The GNSS receiver 52 inputs a signal received from the existing GNSS antenna 28b or the belonging GNSS antenna 28a and outputs the signal as reception signal information from the GNSS satellite 10 to the signal processing device 53 and the measurement module 54.

The signal processing device 53 is a function unit that inputs the reception signal information from the GNSS satellite 10 output by the GNSS receiver 52, performs various signal processing based on the reception signal information, and transmits the processing result to the display operation unit 55. Based on the reception signal information, the signal processing device 53 executes, for example, positioning processing of calculating information such as latitude, longitude, and altitude of the location, and outputs each of this information as positioning information.

The measurement module 54 is a function unit that executes various measurement processing operations such as the time synchronization error measurement (including the 1PPS measurement and the Packet TE measurement). The measurement module 54 performs the 1PPS TE measurement for comparing phases between a signal (a 1PPS signal under test) fetched from the base stations 30, 31, and 32 of the 5G network 1 and a synchronization signal, which is output from the GNSS receiver 52 based on the reception signal input from the existing GNSS antenna 28b or the belonging GNSS antenna 28a, for example, a reference 1PPS signal. Further, the measurement module 54 performs a comparison of PTP packet time with respect to the reference signal (a reference 10 MHz signal), which is output from the GNSS receiver 52 based on the reception signal information received by the existing GNSS antenna 28b used by the network measurement device 50 connected to the boundary clock 21, and performs measurements such as one way delay (OWD) and OWD/Packet TE measurement for measuring the Packet TE.

The display operation unit 55 includes a display function, an input operation function, and a touch panel that also serves as a display function and an input operation function. The display function of the display operation unit 55 displays various screens or information such as a location information setting screen 70 (see FIG. 4), a location information selection screen 80a (see FIG. 6), and a location information edit screen 80b (see FIGS. 7A to 7D), which will be described later. The input operation function of the display operation unit 55 receives various setting operations such as a location information setting operation using the location information setting screen 70 and a location information selection operation using the location information selection screen 80a, or various instruction operations in editing using the location information edit screen 80b.

The storage unit 56 stores various information such as various control information required to measure the performance of the 5G network 1 and programs to be executed to realize each of the functions of a setting control unit 60, an edit control unit 61, a positioning control unit 62, a measurement control unit 63, a display control unit 64, and a sharing control unit 65 in the control unit 57, which will be described later.

The storage unit 56 is provided with a location information table 56a and an export memory 56b. The location information table 56a stores the location information of each test location in the 5G network 1. Specifically, the location information table 56a stores each information on the latitude, longitude, and altitude obtained when the positioning has been executed previously at each test location corresponding to each test location. The export memory 56b is a storage area for temporarily storing the location information read from the location information table 56a when the location information stored in the location information table 56a is transferred to another network measurement device. The location information table 56a configures location information storage means of the present invention, and the export memory 56b configures an export storage area of the present invention.

Figures 3, 4:
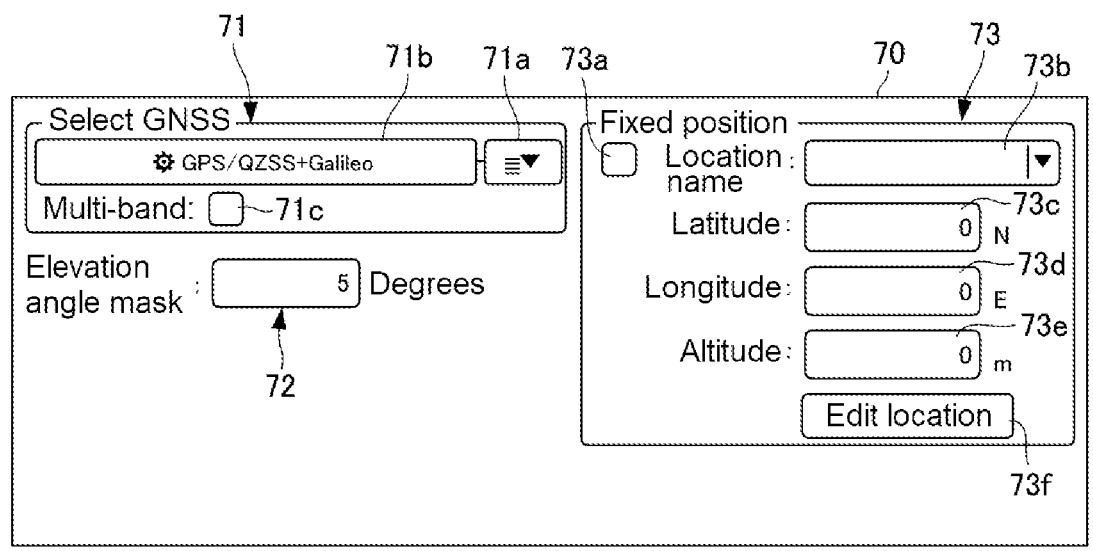
FIG. 3 is a table illustrating a configuration example of a location information table that stores location information related to time synchronization error measurement of the network measurement device according to the embodiment of the present invention.
FIG. 4 is a diagram illustrating a configuration example of a location information setting screen related to the time synchronization error measurement of the network measurement device according to the embodiment of the present invention.

An example of the location information table 56a is illustrated in FIG. 3. As illustrated in FIG. 3, the location information table 56a has a configuration in which each information on the latitude, longitude, and altitude, which is obtained by the positioning that was performed previously (last time) at each test location corresponding to a location name (identification information for identifying each of the test locations), is stored as the positioning start location information for starting the positioning at each test location. In the example of FIG. 3, the location information corresponding to five test locations is stored, but a configuration in which a larger (or smaller) number of location information is stored may be used.

The control unit 57 controls the entire network measurement device 50 and includes the setting control unit 60, the edit control unit 61, the positioning control unit 62, the measurement control unit 63, the display control unit 64, and the sharing control unit 65.

The setting control unit 60 is a processing function unit that receives a setting operation by the input operation function of the display operation unit 55 and sets various information corresponding to the setting operation. The setting control unit 60 is a function unit that performs various settings related to, for example, a new setting (storing) of the location information with respect to the location information table 56a based on the setting operation using the location information setting screen 70, the time synchronization error measurement (including the 1PPS TE measurement and the Packet TE measurement), and the like, in addition to the processing of selecting and designating desired location information from the location information stored in the location information table 56a.

The edit control unit 61 is a function unit that performs edit processing of the location information stored in the location information table 56a. This edit processing is performed using, for example, the location information edit screen 80b.

The positioning control unit 62 is a function unit that performs control of the positioning using the location information corresponding to the test location that is selected from the location information stored in the location information table 56a. In the present embodiment, based on the selected (set) positioning start location information, for example, the positioning control unit 62 includes a pattern of executing the positioning at the location (a disposition location of the boundary clock 21) based on the reception signal information received by the existing GNSS antenna 28b used by the network measurement device 50 connected to the boundary clock 21, and a pattern of performing the positioning at the location (each of the disposition locations of the base stations 30, 31, and 32) based on the reception signal information (second reception signal information) received by the existing GNSS antenna 28b or the belonging GNSS antenna 28a.

The measurement control unit 63 is a function unit that executes various measurements of the 5G network 1 based on the settings in the setting control unit 60, for example, measurement operations such as the 1PPS TE measurement and the OWD/Packet TE measurement.

The display control unit 64 performs control of causing a display function unit of the display operation unit 55 to display various information such as the information set by the setting control unit 60, the positioning information obtained by the positioning control unit 62, and the measurement results based on the measurement control of the measurement control unit 63. Further, the display control unit 64 displays, for example, a location information selection screen 80a (see FIG. 5) and a location information edit screen 80b (see FIG. 6) for performing a list display of the location information stored in the location information table 56a.

The sharing control unit 65 is a part that performs location information sharing processing of sharing the location information stored in the location information table 56*a* with a network measurement device (for example, 50A) different from the network measurement device 50. Specifically, the sharing control unit 65 includes a processing function of outputting the location information stored in the location information table 56*a* to the export memory 56*b* and temporarily storing the location information, and fetching and storing the location information stored in the export memory 56*b* in the location information table 56*a*.

The location information can be shared between the network measurement devices 50 and 50A by connecting another network measurement device 50A having the same processing function as the network measurement device 50 to the network measurement device 50, and in the connected state, in the network measurement device 50A, reading the location information stored in the export memory 56*b* of the network measurement device 50 and storing the location information in the location information table 56*a* of the network measurement device 50A.

The setting control unit 60, the edit control unit 61, the positioning control unit 62, the display control unit 64, and the sharing control unit 65 described above configure the setting means, the edit processing means, the positioning control means, the display control means, and the location information sharing control means of the present invention, respectively.

The display control function of the display control unit 64 will be described in more detail.

The display control unit 64 performs the display control of causing, for example, the display operation unit 55 to display the location information setting screen 70 illustrated in FIG. 4 in response to a predetermined location information setting screen display operation in the display operation unit 55.

As illustrated in FIG. 4, the location information setting screen 70 includes a GNSS selection tool 71, an elevation angle designation tool 72, and a fixed position designation tool 73. The GNSS selection tool 71 is configured such that GNSS types, which are displayed by scrolling a GNSS type field 71*b* in response to the operation of a scroll button 71*a*, can be selected. As the GNSS selection tool 71, a multi-band selection tool 71*c* is further provided in which a multi-band can be selected as needed. The elevation angle designation tool 72 is configured to designate the elevation angle of the GNSS antenna (the belonging GNSS antenna 28*a*, the existing GNSS antenna 28*b*, or the like) connected to the antenna input terminal 51, numerically.

The fixed position designation tool 73 is a tool for designating a fixed position of the test location and is configured with disposing a scroll field 73*b*, a latitude field 73*c*, a longitude field 73*d*, an altitude field 73*e*, and an edit button 73*f* in association with a location name designation tool 73*a*. In the fixed position designation tool 73, the location information corresponding to a location name (identification information for identifying the location) can be directly input (set) by checking the location name designation tool 73*a*, scrolling in the scroll field 73*b* to select the location name, and inputting appropriate values in the latitude field 73*c*, the longitude field 73*d*, and the altitude field 73*e*, respectively. The edit button 73*f* is a function button for instructing the editing of the location information set as described above.

By using the location information setting screen 70 having the above-described configuration, a user can set the location name and the location information after designating the GNSS type, the multi-band or single band (a state in which multi-band is not checked), and the elevation angle of the GNSS antenna connected to the antenna input terminal 51. The GNSS selection tool 71 and the fixed position designation tool 73 constituting the location information setting screen 70 configures an input tool of the present invention.

As described above, in the network measurement device 50 according to the present embodiment, the display control unit 64 can display the location information setting screen 70 having the identification information (the location name) for identifying the test location and input fields (the latitude field 73*c*, the longitude field 73*d*, and the altitude field 73*e*) for inputting each information on the latitude, longitude, and altitude of the test location, and the setting control unit 60 can directly set the latitude, longitude, and altitude of the test location input from the location information setting screen 70 as the location information of the test location. Further, when the synchronization is performed with the GNSS satellite 10 while the positioning is being executed at the test location based on the location information set as described above, that is, when the time, during which the synchronization with the GNSS satellite 10 is continued after starting the positioning, has passed a predetermined time set in advance, the setting control unit 60 includes a processing function of storing the information on the latitude, longitude, and altitude of the test location when the positioning is ended, corresponding to the location name entered from the location information setting screen 70, as location information, in the location information table 56*a*.

Regarding the storage processing function of this location information, for example, the information on the latitude, longitude, and altitude of the test location when the positioning is ended may be manually stored in the location information table 56*a* in association with the identification information of the test location, for example, according to the guidance after entering the identification information of the test location when the positioning is ended (the above predetermined time has elapsed). Further, it is also possible to automatically store the information on the latitude, longitude, and altitude of the test location when the positioning is ended in the location information table 56*a* in association with the identification information of the test location. The location information setting screen 70 described above configures a setting screen of the present invention.

Figure 5:
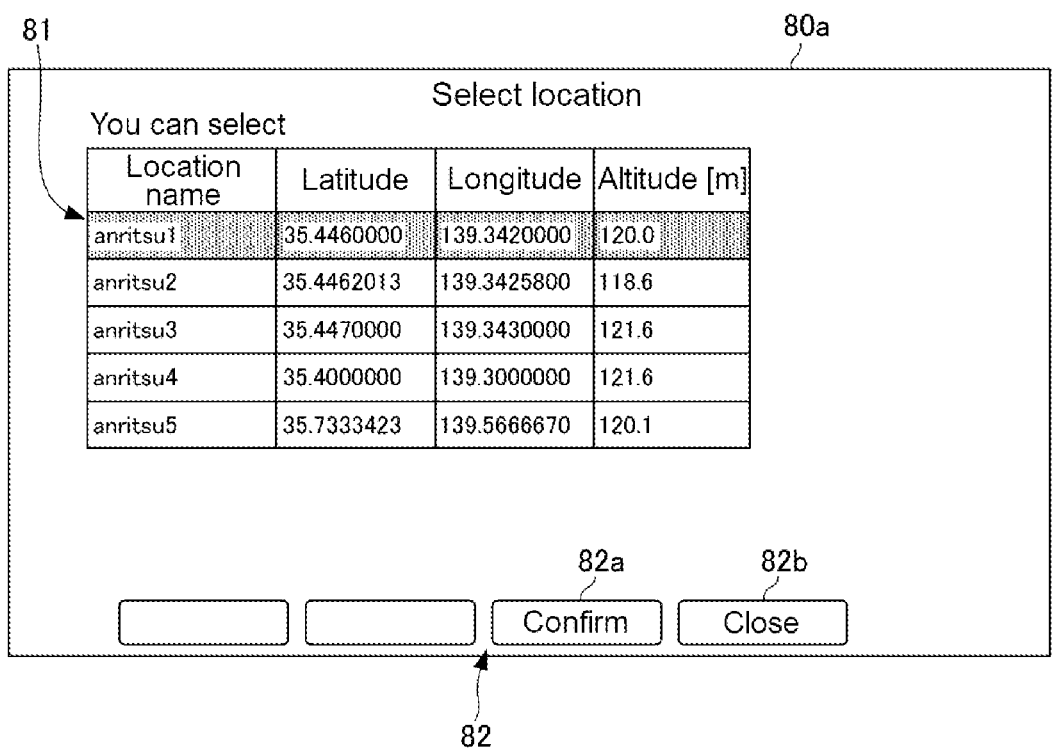
FIG. 5 is a diagram illustrating a configuration example of a location information selection screen related to the time synchronization error measurement of the network measurement device according to the embodiment of the present invention.

Further, the display control unit 64 performs the display control of causing, for example, the display operation unit 55 to display the location information selection screen 80*a* illustrated in FIG. 5 in response to a predetermined location information selection screen display operation in the display operation unit 55. The display control of the location information selection screen 80*a* is performed based on the location information stored in the location information table 56*a*.

The location information selection screen 80*a* includes a location selection designation area 81 and a plurality of function buttons 82. The location selection designation area 81 has a configuration in which each information on the latitude, longitude, and altitude corresponding to a plurality of location names is displayed, and a desired location name of the plurality of location names can be selected together along with each information on the latitude, longitude, and altitude corresponding to the location name. In FIG. 5, a gray-filled portion in the location selection designation area 81 indicates that the area is selected by the user. The function button 82 is composed of a confirm button 82*a* and a close button 82*b*. According to the location information selection screen 80a, the user can instruct the setting of the location information by pressing the confirm button 82a in a state in which the desired location name (and the latitude, longitude, altitude) is selected in the location selection designation area 81.

Figure 6:
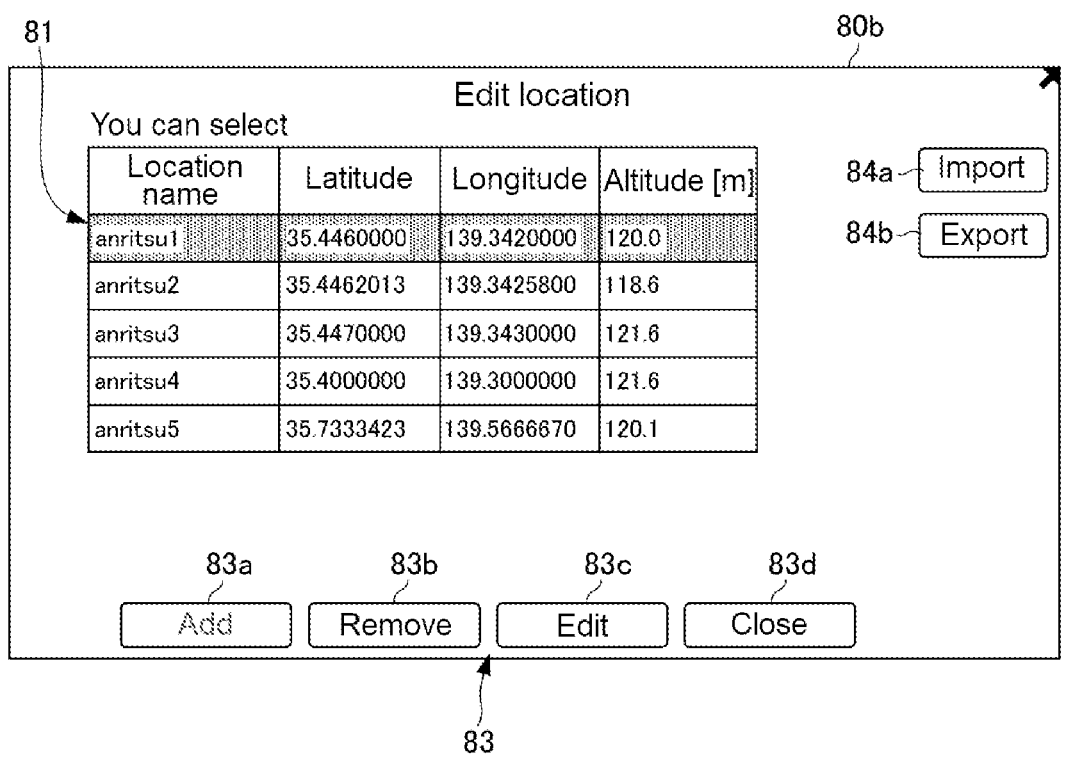
FIG. 6 is a diagram illustrating a configuration example of a location information edit screen related to the time synchronization error measurement of the network measurement device according to the embodiment of the present invention.
Figure 7:
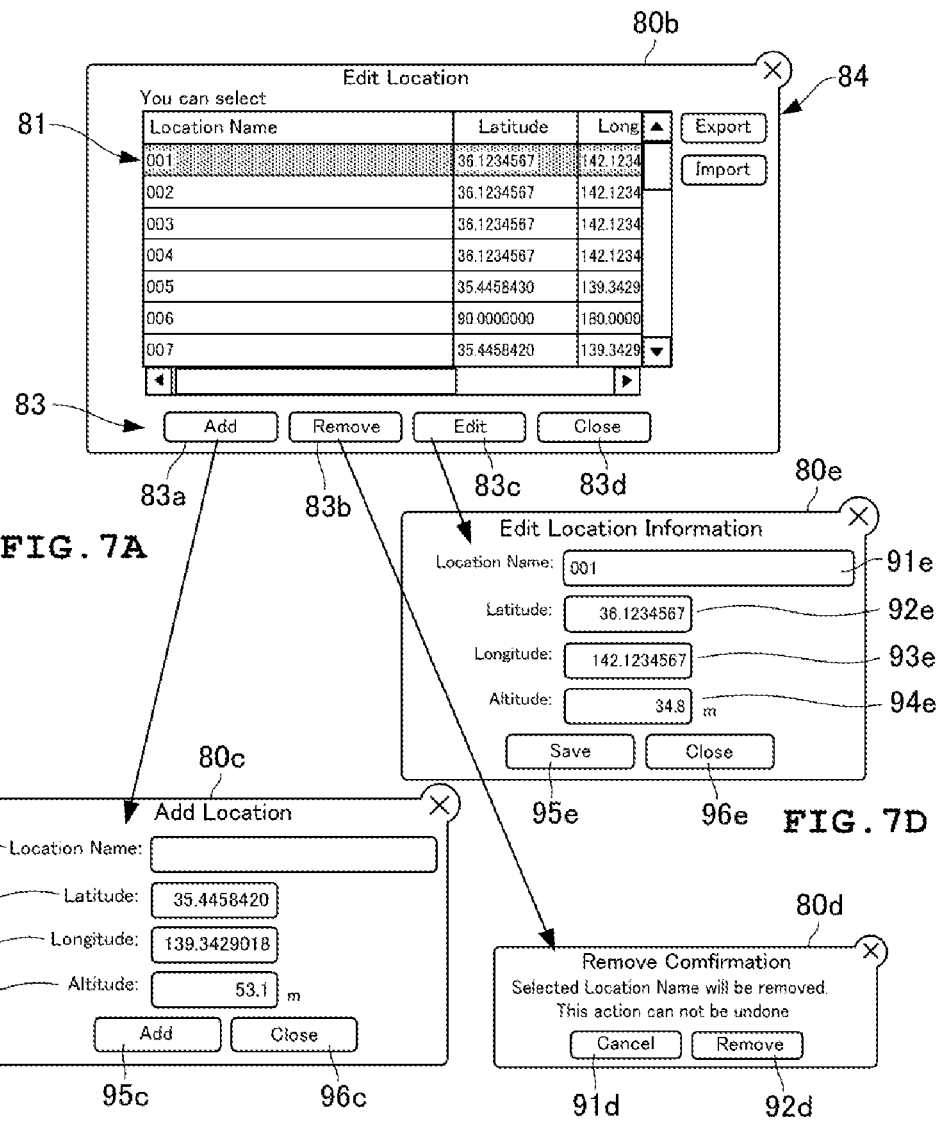
FIGS. 7A to 7D are views illustrating a configuration of a transition screen transitioned from the location information edit screen in FIG. 6, where

Further, the display control unit 64 performs the control of causing the display operation unit 55 to display, for example, the location information edit screen 80b illustrated in FIG. 6 based on the location information stored in the location information table 56a by receiving a predetermined location information edit screen display operation in the display operation unit 55. As illustrated in FIG. 6, the location information edit screen 80b includes a location selection designation area 81, a plurality of function buttons 83, an import button 84a, and an export button 84b.

Similar to the location information setting screen 70 (see FIG. 5), the location selection designation area 81 has a configuration in which each information on the latitude, longitude, and altitude corresponding to a plurality of location names is displayed, and a desired location name of the plurality of location names can be selected together along with each information on the latitude, longitude, and altitude corresponding to the location name. A gray-filled portion in the location selection designation area 81 indicates that the area is selected by the user.

The function button 83 is composed of an add button 83a, a remove button 83b, an edit button 83c, and a close button 83d. By pressing the remove button 83b or the edit button 83c on the location information edit screen 80b, it is possible to move to a mode for removing or editing the location information (see FIGS. 7A to 7D) in a state in which the desired location name (the latitude, longitude, and altitude) is selected in the location selection designation area 81. Further, by pressing the add button 83a on the location information edit screen 80b, it is possible to shift the mode to an add setting mode (see FIGS. 7A to 7D) described later and perform additional registration of the location information. The close button 83d is used when the location information edit screen 80b is closed.

Further, on the location information edit screen 80b, the import button 84a and the export button 84b are tools used for sharing control of the location information by the sharing control unit 65. That is, the export button 84b is a function button for invoking export processing of reading the location information corresponding to the selected location name from the location information table 56a and storing the location information in the export memory 56b by pressing the export button 84b in a state in which the desired location name (and the latitude, longitude, altitude) is selected in the location selection designation area 81. The import button 84a is a button operated when the location information stored in the export memory 56b is stored in the location information table 56a.

In the above-described configuration, the location information edit screen 80b and the location selection designation area 81 configure an edit screen and an area of the present invention, respectively. Further, the add button 83a, the remove button 83b, and the edit button 83c each configures a selection button of the present invention.

A transition control to each mode of adding, removing, and editing the location information using the location information edit screen 80b will be described. In the network measurement device 50, the display control unit 64 has a display control function of transitioning the mode to add, remove, and edit the location information from the location information edit screen 80b to each edit screen in response to a pressing operation of each of the add button 83a, the remove button 83b, and the edit button 83c on the location information edit screen 80b.

FIGS. 7A to 7D illustrate examples of a transition pattern from the location information edit screen 80b in FIG. 6 to each edit screen. FIG. 7A illustrates the location information edit screen 80b that is a transition source, FIG. 7B illustrates an add setting screen 80c that transitions in response to pressing the add button 83a, FIG. 7C illustrates a remove alert screen 80d that transitions in response to pressing the remove button 83b, and FIG. 7D illustrates a change setting edit screen 80e that transitions in response to pressing the edit button 83c.

As illustrated in FIGS. 7A to 7D, in the network measurement device 50, the screen transitions to the add setting screen 80c (see FIG. 7B) by pressing the add button 83a in a state in which a location number is selected on the location information edit screen 80b (see FIG. 7A). According to the configuration of the add setting screen 80c according to the present embodiment, by inputting the desired location name, and each information on the latitude, longitude, and altitude in each of the input fields 91c, 92c, 93c, and 94c, and pressing the add button 95c, the location information having the input value can be newly stored in the location information table 56a corresponding to the location number. By pressing the close button 96c on the add setting screen 80c, it is possible to return to the location information edit screen 80b from the add setting screen 80c.

Further, in the network measurement device 50, by pressing the remove button 83b in a state in which the desired location name is selected on the location information edit screen 80b, the screen transitions to the remove alert screen 80d (see FIG. 7C). A message alert the removal is displayed on the remove alert screen 80d. According to the configuration of the remove alert screen 80d according to the present embodiment, by pressing the remove button 92d, the location information in a selection state is removed from the location information table 56a. In contrast to this, when the cancel button 91d is pressed on the remove alert screen 80d, the removal of the location information in a selection state is prohibited, and the display control of returning the screen from the remove alert screen 80d to the location information edit screen 80b is performed.

Further, in the network measurement device 50, by pressing the edit button 83c in a state in which the desired location name is selected on the location information edit screen 80b, the screen transitions to the change setting edit screen 80e (see FIG. 7D). According to the configuration of the change setting edit screen 80e according to the present embodiment, by inputting the desired location name, and each information on the latitude, longitude, and altitude (change setting contents) in each of the input fields 91e, 92e, 93e, and 94e, and pressing the save button 95e, the location information stored in the location information table 56a corresponding to the location name can be changed and stored according to the input value. By pressing the close button 96e on the change setting edit screen 80e, it is possible to return to the location information edit screen 80b from the change setting edit screen 80e.

As described above, in the network measurement device 50 according to the present embodiment, the display control unit 64 displays the location information edit screen 80b having a location selection designation area 81 for displaying the location information of each test location stored in the location information table 56a, and selection buttons (the add button 83a, remove button 83b, edit button 83c) for selecting one of the edit types of add, remove, and change setting of the location information designated (selected) from the location information for each test location displayed. Further, using the location information edit screen 80b and for the location information designated from the location information for each test location, the edit control unit 61 is configured to execute any one of edit processing of add, remove, and change setting in response to the selection of the edit type by the selection button.

Figure 8:
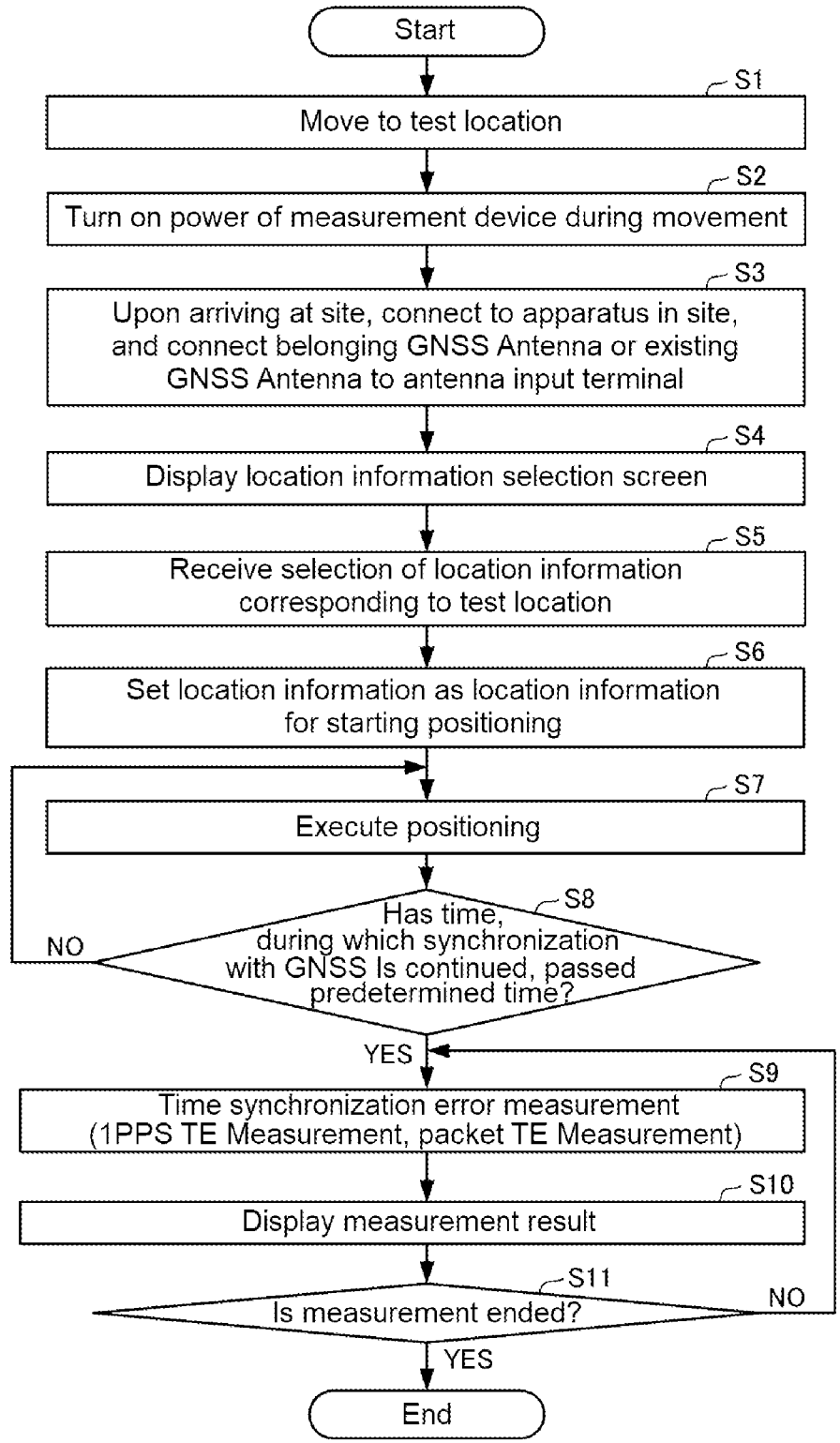
FIG. 8 is a flowchart illustrating a control operation of the time synchronization error measurement of the network measurement device according to the embodiment of the present invention.

Next, a control operation of the time synchronization error measurement in the network measurement device 50 according to the embodiment of the present invention will be described with reference to the flowchart illustrated in FIG. 8. In FIG. 8, in particular, a control operation when performing the 1PPS TE measurement in the base stations 30, 31, and 32 on the 5G network 1 as a target will be described.

The network measurement device 50 according to the present embodiment, for example, is moved to the site of each of the disposition locations of the base stations 30, 31, and 32 in the 5G network 1 illustrated in FIG. 1 as the test location as needed, and starts the time synchronization error measurement, for example, the 1PPS TE measurement related to the base stations 30, 31, and 32 when the time, during which the synchronization with the GNSS satellite 10 is continued at each test location of the moving destination, has passed a predetermined time. Prior to the start of the time synchronization error measurement, the network measurement device 50 stores the location information table 56a, which stores the location information corresponding to each test location, in the storage unit 56, for example. The present invention is not limited to the 5G network 1, but the networks illustrated in FIGS. 14A and 14B or an apparatus constituting the network can be defined as a target under test. In this case, the plurality of base stations 30, 31, and 32 are replaced with network apparatuses, data centers in which the base stations are installed, or the like, respectively.

The network measurement device 50 is moved to the test location, for example, the disposition location of the base station 30 to start the time synchronization error measurement, for example, the 1PPS TE measurement (step S1). When a vehicle is used as moving means, for example, it is desirable to turn on the power of the network measurement device 50 during the movement (step S2) and stabilize an operation of a reference frequency transmitter provided in the GNSS receiver 52 before arriving at the test location. The reference frequency transmitter outputs the above-mentioned reference 1PPS signal based on the reception signal from the GNSS satellite 10.

Upon arriving at the test location (site), the 1PPS measurement terminal 59 of the network measurement device 50 is connected to a signal under test output terminal (not illustrated) of the base station 30 that is the target under test, and the belonging GNSS antenna 28a that belongs to the network measurement device 50 or the existing GNSS antenna 28b installed in the vicinity of the base station 30 is connected to the antenna input terminal 51 (step S3). In FIG. 1, it is assumed that the existing GNSS antenna 28b installed in the vicinity of the base station 30 is connected to the antenna input terminal 51. As a result, the network measurement device 50 is ready to input the signal under test (the 1PPS signal under test) from the base station 30 that is the target under test while receiving the signal from the GNSS satellite 10.

After that, the network measurement device 50 receives a predetermined location information selection screen call operation in the display operation unit 55, so that the display control unit 64 causes the display operation unit 55 to display the location information selection screen 80a (see FIG. 5A) (step S4).

Next, the setting control unit 60 receives the selection of the location information corresponding to the test location from the location information listed on the location information selection screen 80a displayed by the display operation unit 55 (step S5). Next, the setting control unit 60 reads the selected location information from the location information table 56a and sets the location information in the GNSS receiver 52 as the positioning information of the network measurement device 50 at that time (step S6).

After that, in the network measurement device 50, the signal processing device 53 starts (executes) the positioning at the location under the control of the positioning control unit 62 by receiving a predetermined time synchronization error measurement start operation in the display operation unit 55 (step S7).

While the positioning is being executed, the measurement control unit 63 determines whether or not the time, during which the synchronization with the GNSS satellite 10 is continued, has passed a predetermined time set in advance based on the position information obtained by positioning based on the reception signal information received by the GNSS satellite 10 by, for example, the existing GNSS antenna 28b of the base station 30, and the above-mentioned set positioning information (location information) (step S8).

When it is determined that the predetermined time has not passed (NO in step S8), the synchronization control is repeatedly executed by continuing the processes after step S7, and meanwhile when it is determined that the predetermined time has passed (YES in step S8), time synchronization error measurement processing is executed (step S9). The time synchronization error measurement includes the 1PPS TE measurement and the Packet TE measurement. In this example, the 1PPS TE measurement is executed as the time synchronization error measurement processing.

When the time synchronization error measurement, for example, the 1PPS TE measurement is started in the network measurement device 50, the measurement control unit 63 controls to input a signal from the GNSS satellite 10 received by, for example, the existing GNSS antenna 28b of the base station 30, which is connected to the antenna input terminal 51, to the GNSS receiver 52, generate a reference 1PPS signal from the input signal and transmit the signal to the measurement module 54, and fetch the 1PPS signal under test, which is output as a comparison target of the reference 1PPS signal from the base station 30 that is the target under test, and transmit the signal to the measurement module 54.

The measurement module 54 compares the reference 1PPS signal input from the GNSS receiver 52 with the 1PPS signal under test output from the base station 30 as a comparison target and measures a phase error, a deviation, and a filter time error (TE) of both signals.

Figure 12:
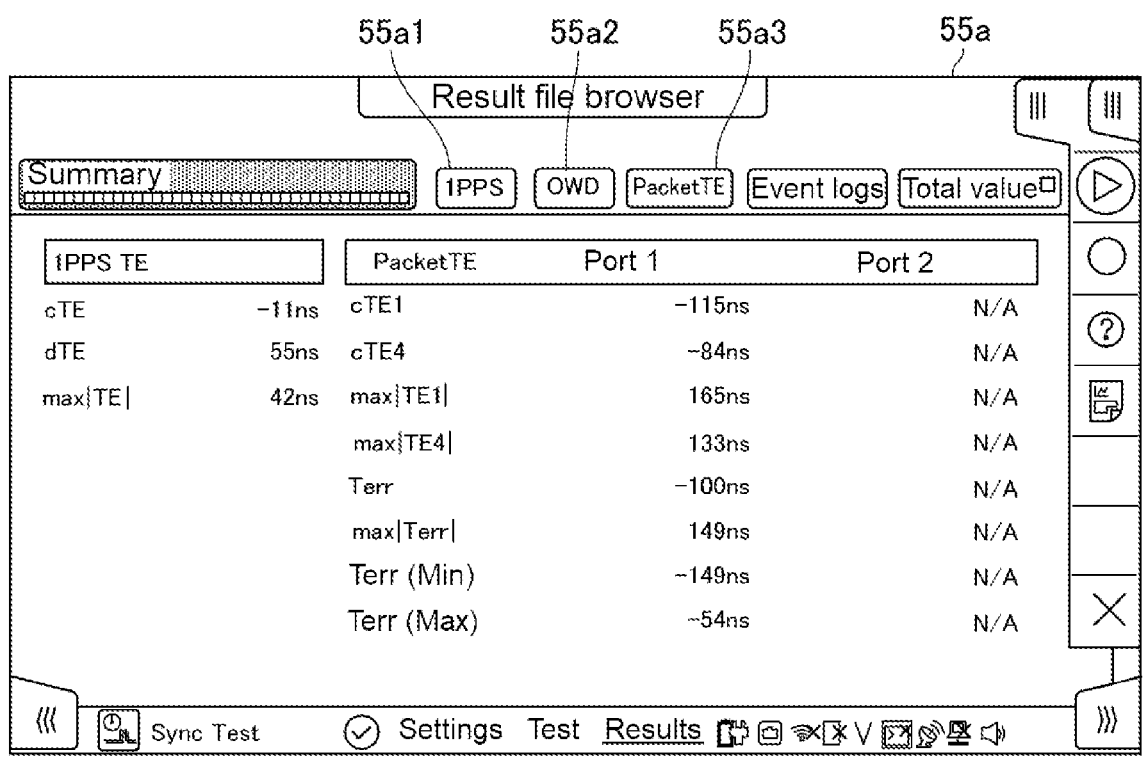
FIG. 12 is a diagram illustrating a configuration example of a test result display screen for the time synchronization error measurement of the network measurement device according to the embodiment of the present invention.
Figure 13A:
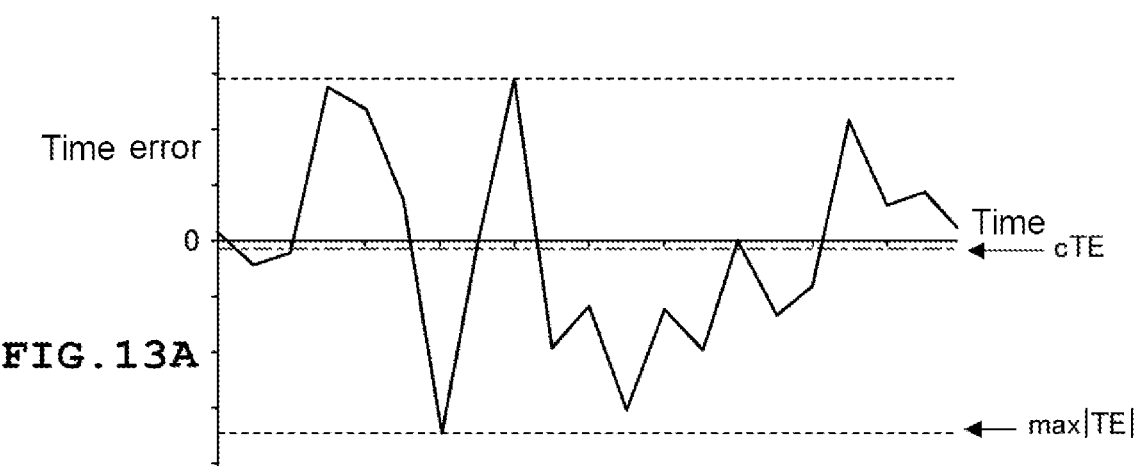
FIGS. 13A and 13B are diagrams of an example of a measurement result of 1PPS TE in the time synchronization error measurement of the network measurement device according to the embodiment of the present invention, where
Figure 13B:
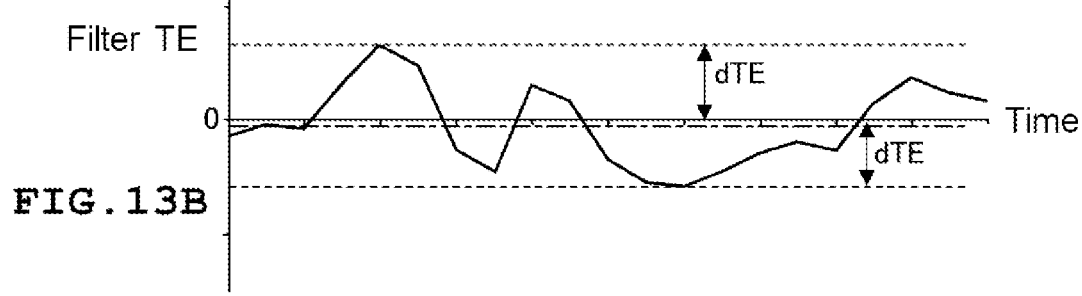

When the time synchronization error measurement is ended, the display control unit 64 controls the display operation unit 55 to display a test result display screen 55a showing the test results up to that point (step S10). An example of the test result display screen 55a is illustrated in FIG. 12. As illustrated in FIG. 12, a summary of the time synchronization error measurement is displayed on the test result display screen 55a.

It is possible to shift to each display screen with respective predetermined operations from the displayed test result display screen 55a.

During the execution of the screen transition described above, the measurement control unit 63 checks whether or not the display operation unit 55 receives a measurement end operation (step S11). When it is determined that the measurement end operation is not received (NO in step S11), the processes after step S9 are continued. When it is determined that the measurement end operation is received meanwhile (YES in step S11), the series of time synchronization error measurement processing described above is ended.

Figure 9:
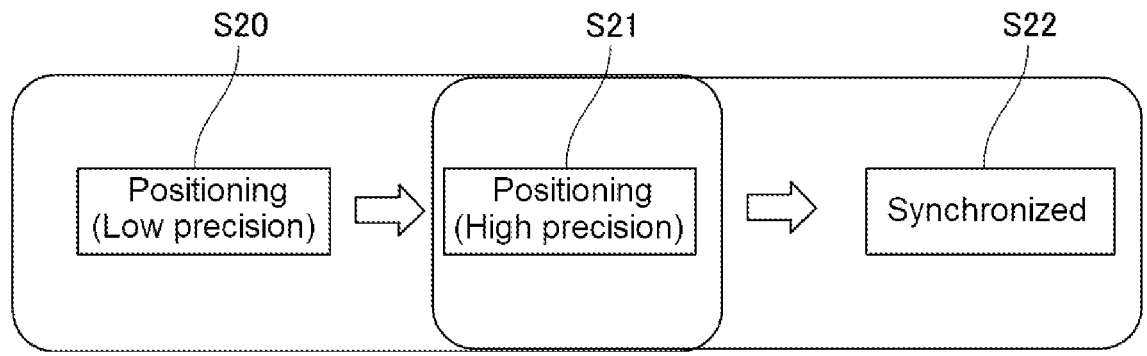

Next, a synchronization time reduction effect with the GNSS satellite 10 by the processes of steps S2 and S4 to S7 in FIG. 8 will be described. FIG. 9 illustrates a processing image showing a process from a low precision positioning state to a high precision positioning state and synchronization after the power of the portable network measurement device is turned on. As described above, in the conventional measurement devices 8 illustrated in FIGS. 14A and 14B, it is common to input the location information of the test location and start positioning after arriving at the site (test location).

In this case, when the positioning is started, the low precision positioning state (see step S20 in FIG. 9) is continued for a while until a certain degree of accurate position information is calculated, and after that the process shifts to a positioning state (step S21 in FIG. 9) in which a higher precision and desired precision position information can be obtained, and then the process shifts to a measurement stage after waiting for the time, during which the synchronization with the GNSS satellite 10 is continued, reaches the preset predetermined time (see step S22 in FIG. 9). With such a conventional measurement device 8, since it requires a long time (for example, substantially several tens of minutes) from the low precision positioning to the end of the high precision positioning and takes time to start the measurement, efficient measurement cannot be expected.

In contrast to this, the network measurement device 50 according to the present embodiment includes the location information table 56a that stores the location information of each positioned location, which is previously measured, corresponding to each test location, and the power is turned on during movement (see step S2 in FIG. 8) to stabilize the operation of the GNSS receiver 52 (reference frequency transmitter). Therefore, in the network measurement device 50 according to the present embodiment, as illustrated in steps S4 to S7 of FIG. 8, the location information obtained in the previous positioning corresponding to the test location is selectively set by using the location information table 56a upon arriving at the test location, and it is possible to achieve a state extremely close to a high precision positioning state immediately after the positioning is started (see step S21 in FIG. 9). After that, even when it takes some time to end the high precision positioning, the time corresponding to the low precision positioning state (see step S21 in FIG. 9) can be saved. As a result, in the network measurement device 50 according to the present embodiment, the time from setting the location information at the site (test location) to the start of measurement can be significantly shortened, and it is possible to make extremely efficient measurements through the test of the entire 5G network 1.

Next, the time synchronization error measurement processing in step S9 of FIG. 8 and the measurement result display processing in step S10 will be described with reference to FIGS. 10 to 13.

Figure 10:
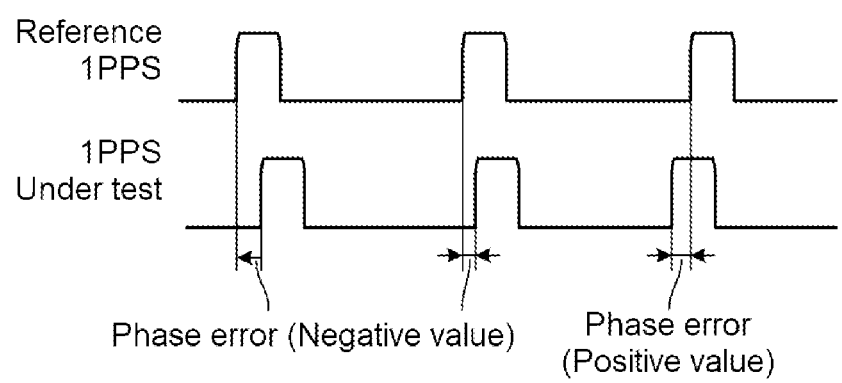
FIG. 10 is a timing chart for describing a definition of a phase error related to 1PPS TE measurement in the time synchronization error measurement of a network measurement device according to the embodiment of the present invention.

In the time synchronization error measurement performed in step S9 of FIG. 8, the 1PPS TE measurement and the OWD/Packet TE measurement are performed as described above. In the 1PPS TE measurement, a phase comparison is performed on the 1PPS signal under test with respect to the reference 1PPS signal, and the phase error, deviation, and filter TE of both signals are measured. As illustrated in FIG. 10, the phase error corresponds to, for example, a time difference of the 1PPS signal under test with respect to the reference 1PPS signal. When the reference 1PPS signal is ahead of the 1PPS signal under test, a value is negative, and when the 1PPS signal under test is ahead of the reference 1PPS signal, the value is positive. The reference 1PPS signal and the 1PPS signal under test correspond to the reference time information and the reference time information under test of the present invention, respectively.

Figure 11:
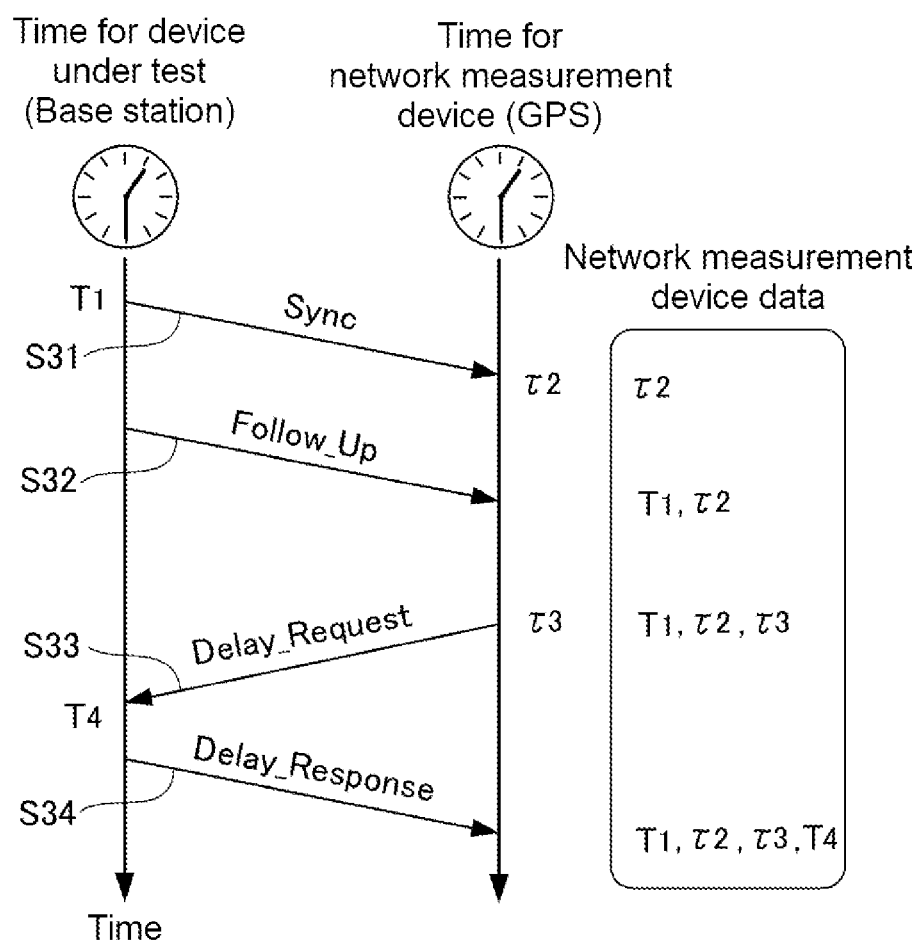
FIG. 11 is a diagram illustrating a control procedure related to OWD/Packet TE measurement in the time synchronization error measurement of the network measurement device according to the embodiment of the present invention.

The OWD/Packet TE measurement can be performed, for example, according to the control procedure illustrated in FIG. 11. First, in step S31, a device under test (base stations 30, 31, and 32) transmits a sync message to the network measurement device 50. T1 is defined as a time stamp of the device under test when the sync message is transmitted. When a follow up message (see step S32) is not used, T1 is notified to a slave clock with the sync message. T2 is defined as a time stamp of the network measurement device 50 when the network measurement device 50 receives the sync message.

When the device under test transmits a follow up message in step S32, T1 is notified to the network measurement device with the follow up message.

In step S33, the network measurement device 50 transmits a delay request message to the device under test. T3 is defined as a time stamp of the network measurement device when the delay request message is transmitted. T4 is defined as a time stamp of the device under test when the device under test receives the delay request message.

In step S34, the device under test transmits a delay request message to the network measurement device 50 and notifies the network measurement device 50 of T4.

The network measurement device 50 can calculate the OWD and the Packet TE based on the data obtained in the above procedure. As an example, the sync OWD can be obtained by using a formula (τ2−T1), and the delay request OWD can be obtained by using a formula (T4−τ3).

In step S10 of FIG. 8, the measurement results of the 1PPS TE measurement and the OWD/Packet TE measurement in the time synchronization error measurement described above (see step S9 of FIG. 8) are, for example, displayed on the test result display screen 55a illustrated in FIG. 12. A summary of the time synchronization error measurement is displayed on the test result display screen 55a. Among the information configuring the summary, TE indicates the phase error (time difference) between the reference 1PPS signal and the 1PPS signal under test, and has, for example, a type such as a constant time error (cTE), a dynamic time error (dTE), a max|TE|. Where, cTE indicates an average value of the phase error (see FIG. 13A). dTE indicates an amount of deviation from the average value of the filter TE (see FIG. 13B). max|TE| indicates the maximum value of the phase error expressed as an absolute value. The test result display screen 55a includes a 1PPS button 55a1, an OWD button 55a2, and a Packet TE button 55a3, and by pressing the 1PPS button 55a1, the OWD button 55a2, and the Packet TE button 55a3, it is possible to switch to the display of detailed measurement results related to the 1PPS, OWD, and packet TE measurement, respectively.

Although the detailed operation description is omitted in FIG. 8 (see step S8), needless to say, the network measurement device 50 according to the present embodiment can be moved to the disposition location of the boundary clock 21 and perform the Packet TE measurement as a test targeting the 5G network 1. To perform the Packet TE measurement, for example, the network measurement device 50 and the boundary clock 21 may be connected so as to connect the existing GNSS antenna 28b to the antenna input terminal 51, for example, while connecting the external connection port of the boundary clock 21 to the network measurement terminal 58.

Further, in the above embodiment, a configuration example corresponding to a single band that mainly uses reception signal information from a single GNSS has been described, but needless to say, the present invention can also be applied to a multi-band compatible configuration that uses the reception signal information from a plurality of GNSSs.

As described above, in the network measurement device 50 according to the present embodiment is a portable device that uses the 5G network 1, in which a plurality of base stations 30, 31, and 32 (the boundary clock 21 can also be the measurement target) disposed in different test locations from each other operate in time synchronization with reference time information acquired from the GNSS satellite 10, is moved to a desired test location and connected to any of the base stations 30, 31, and 32 in the test location, and then starts positioning at the test location based on reception signal information from the GNSS satellite 10, establishes time synchronization with the GNSS satellite 10, and then measures the performance of the 5G network 1. The network measurement device 50 includes the location information table 56a for storing the position information about the test location where the positioning has been executed previously, as the location information each corresponding to at least one test location, the display control unit 64 that displays the location information about the test location stored in the location information table 56a when the network measurement device is connected to the base stations 30, 31, and 32 in the test location of the moving destination, and the setting control unit 60 that sets location information selected from the displayed location information about the test location as positioning start location information for starting the positioning for the test location.

With this configuration, since the positioning is started using the location information stored when the positioning was performed previously for each test location, the network measurement device 50 according to the present embodiment can start measurement on the 5G network 1, which requires extremely high time accuracy and precision, by establishing the synchronization with the GNSS satellite 10 in a short time by a simple operation even when the test location changes, thereby the measurements such as the synchronization error measurement can be efficiently performed.

Further, the network measurement device 50 according to the present embodiment further includes the antenna input terminal 51 capable of connecting the existing GNSS antenna 28b that corresponds to the apparatus such as base stations 30, 31, and 32, or boundary clock 21 in place of the belonging GNSS antenna 28a that belongs to the self device (the network measurement device 50), the positioning control unit 62 that executes the positioning at the location based on the reception signal information received by the existing GNSS antenna 28b and the reception processing of the reception signal information, based on the positioning start location information set by the setting control unit 60, in a state in which the self device is connected to any of the apparatuses and the existing GNSS antenna 28b is connected to the antenna input terminal 51.

With this configuration, the network measurement device 50 according to the present embodiment can perform input of the reception signal information from the existing GNSS antenna 28b by connecting the self network measurement device to the apparatus at the test location and connecting the existing GNSS antenna 28b to the antenna input terminal 51. The existing GNSS antenna 28b has high precision because the location of the antenna's position is fixed, or has good quality where the high signal intensity is obtained and less noise occurs because the view is secured as a reception condition, thereby it is possible to acquire high time accuracy and precision.

Further, in the network measurement device 50 according to the present embodiment, the display control unit 64 displays the location information setting screen 70 having a function of inputting the location name and each information on latitude, longitude, and altitude of the location of the location name, and the setting control unit 60 sets the latitude, longitude, and altitude of the location of the location name input from the location information setting screen 70 as the location information about the location, and while the positioning is being executed at the location based on the set location information, when time, during which the synchronization with the GNSS is continued after starting the positioning, has passed a predetermined time set in advance, manually or automatically store the information on the latitude, longitude, and altitude of the location when the positioning is ended, corresponding to the location name input from the location information setting screen 70, as the location information, in the location information table 56a.

With this configuration, the network measurement device 50 according to the present embodiment can easily and automatically or manually store the highly precise location information corresponding to the location in the location information table 56a according to the measurement of the 5G network 1 at the first location. As a result, when the measurement is performed at the location next time, the location information can be easily set, and the time for establishing the synchronization with the GNSS satellite 10 can be significantly shortened, and then efficient measurement becomes possible.

Further, in the network measurement device 50 according to the present embodiment, the display control unit 64 displays the location information edit screen 80b having the location selection designation area 81 for displaying the location information about the location stored in the location information table 56a and selection buttons (the add button 83a, the remove button 83b, the edit button 83c) for selecting one of edit types of adding, removing, and editing (change setting) location information designated from the displayed location information about the location, and the network measurement device 50 further includes the edit control unit 61 that executes any one of edit processing among adding, removing, and change settings in response to the selection of the edit type by the selection button, with respect to the location information designated among the location information about the location.

With this configuration, the network measurement device 50 according to the present embodiment can easily perform each processing of adding, removing, and editing location information with respect to the location information table 56a by using the location information edit screen 80b.

Further, the network measurement device 50 according to the present embodiment, further includes the sharing control unit 65 that performs sharing control of outputting the location information stored in the location information table 56a to the export memory 56b and storing the location information in the export memory 56b, and fetching the location information stored in the export memory 56b and storing the location information in the location information table 56a.

With this configuration, the network measurement device 50 according to the present embodiment can share the location information about each location stored in the location information table 56a with another network measurement device 50A by a simple operation.

Further, in a network measurement method according to the present embodiment in which the 5G network 1 is measured by using the network measurement device 50 described above, the network measurement method includes a step (S3) of moving the network measurement device to a desired test location and connecting the network measurement device 50 to any of the base stations 30, 31, and 32 (the boundary clock 21 may be used), and connecting the GNSS antenna (the belonging GNSS antenna 28a or existing GNSS antenna 28b) to the antenna input terminal 51, a display control step (S4) of listing and displaying the location information about the test location stored in the location information table 56a when the network measurement device is connected to any of the base stations 30, 31, and 32 in the test location, a setting step (S5, S6) of setting location information selected from the listed and displayed location information about the test location as the positioning start location information for starting the positioning at the test location, a positioning control step (S7, S8) of executing the positioning at the location based on the reception signal information received by the existing GNSS antenna 28b or the belonging GNSS antenna 28a and reception processing of the reception signal information, based on the set positioning start location information, and a measurement step (S9) of measuring a time synchronization error between the reference time information (a reference 1PPS signal) acquired from the GNSS satellite 10 and reference time information under test (a 1PPS signal under test), which is time information output by the base stations 30, 31, and 32 in the test location, by comparing the reference time information and the reference time information under test when time, during which the synchronization with the GNSS satellite 10 is continued after starting the positioning, has passed the predetermined time set in advance.

With this configuration, the network measurement method according to the present embodiment can be applied to a network measurement method using the network measurement device 50, and then since the positioning is started using the location information stored when the positioning was performed previously for each test location, the measurement can be started on the 5G network 1, which requires extremely high time accuracy and precision, by establishing the synchronization with the GNSS satellite 10 in a short time by a simple operation even when the measurement location changes, thereby the measurements such as the synchronization error measurement can be efficiently performed.

INDUSTRIAL APPLICABILITY

As described above, the network measurement device and the network measurement method according to the present invention can start the measurement on the network under test, which requires extremely high time accuracy and precision, by establishing the synchronization with the satellite positioning system in a short time by a simple operation even when the measurement location changes, have the effect of being able to perform measurements efficiently, and are useful for portable network measurement devices and network measurement methods in general for measuring the performance of the network under test based on the reception signal information from the GNSS.

DESCRIPTION OF REFERENCE NUMERALS AND SIGNS 1 5G network (network under test)
10 GNSS satellite (a part of GNSS)
21 boundary clock (apparatus)
28a belonging GNSS antenna (GNSS antenna)
28b existing GNSS antenna (reception antenna system including GNSS antenna, cable, reception amplifier, filter, or the like)
30, 31, 32 base stations (apparatus)
50 network measurement device
51 antenna input terminal
55 display operation unit
56 storage unit
56a location information table (location information storage means)
56b export memory (export storage area)
57 control unit
58 network measurement terminal
59 1PPS measurement terminal
60 setting control unit (setting means)
61 edit control unit (edit processing means)
62 positioning control unit (positioning control means)
64 display control unit (display control means)
65 sharing control unit (location information sharing control means)
70 location information setting screen (setting screen)
71 GNSS selection tool (input tool)
73 fixed position designation tool 73 (input tool)
80b location information edit screen (edit screen)
81 location selection designation area (area)
83a add button (selection button)
83b remove button (selection button)
83c edit button (selection button)

What is claimed is:

1. A portable network measurement device that uses a network under test, in which a plurality of apparatuses disposed in different locations from each other operate in time synchronization with reference time information acquired from a global navigation satellite system (GNSS), is moved to a desired location and connected to any of the apparatuses, and then starts positioning at the location based on reception signal information from the GNSS, establishes time synchronization with the GNSS, and then measures performance of the network under test, the network measurement device comprising:
    a location information storage configured to store information about at least one location where the positioning has been executed previously, as location information;
    a controller configured to:
        display, on a display, the location information stored in the location information storage when the network measurement device is connected to the apparatus in the location;
        receive an input selecting one of the at least one location; and set location information of a selected location from the displayed location information as positioning start location information.

2. The network measurement device according to claim 1, further comprising:
an antenna input terminal capable of connecting an existing GNSS antenna that corresponds to the apparatus in place of a belonging GNSS antenna that belongs to the network measurement device, wherein
the controller is further configured to execute positioning based on reception signal information received by the existing GNSS antenna and reception processing of the reception signal information, based on the positioning start location information set by the controller, in a state in which the network measurement device is connected to any of the apparatuses and the existing GNSS antenna corresponding to the connected apparatus is connected to the antenna input terminal.

3. The network measurement device according to claim 1, wherein
the controller is further configured to cause the display to display a setting screen having input tools for inputting identification information for identifying the location and each information on latitude, longitude, and altitude of the location, and
the controller is further configured to set the latitude, longitude, and altitude of a location input from the setting screen as location information about the location, and while the positioning is being executed at the location based on the set location information, when time, during which synchronization with the GNSS is continued after starting the positioning, has passed a predetermined time set in advance, and manually or automatically stores the information on the latitude, longitude, and altitude of the location when the positioning is ended, corresponding to the identification information input from the setting screen, as the location information, in the location information storage.

4. The network measurement device according to claim 1, wherein
the controller is further configured to display an edit screen having an area for displaying the location information stored in the location information storage and selection buttons for selecting one of edit types of addition, removal, and edition location information designated from the displayed location information, and
the controller is further configured to execute any one of edit processing among adding, removing, and editing in response to a selection of the edit type by the selection button, with respect to the designated location information.

5. The network measurement device according to claim 1, wherein the controller is further configured to output the location information stored in the location information storage to an export storage area and storing the location information in the export storage area, and fetch the location information stored in the export storage area and store the location information in the location information storage.

6. A network measurement method of measuring the network under test by using the network measurement device according to claim 1, the network measurement method comprising:
moving the network measurement device to a desired location and connecting the network measurement device to any of the apparatuses, and connecting a GNSS antenna to an antenna input terminal;
displaying the location information stored in the location information storage when the network measurement device is connected to the apparatus in the location;
setting location information selected from the displayed location information as positioning start location information;
executing positioning at the location based on reception signal information received by the GNSS antenna and reception processing of the reception signal information, based on the set positioning start location information; and
measuring a time synchronization error between reference time information (a reference 1PPS signal) acquired from the GNSS and reference time information under test (a 1PPS signal under test), which is time information output by the apparatus in the location, by comparing the reference time information and the reference time information under test when time, during which synchronization with the GNSS is continued after starting the positioning, has passed a predetermined time set in advance.

* * * * *